(12) United States Patent
Crowther et al.

(10) Patent No.: US 9,960,660 B2
(45) Date of Patent: May 1, 2018

(54) BRUSHLESS DC MOTOR WITH REDUCED EMISSIONS

(71) Applicant: HALLA VISTEON CLIMATE CONTROL CORPORATION, Daejeon-si (KR)

(72) Inventors: David Crowther, Bloomfield Township, MI (US); Jesse Whitfield, Port Franks (CA)

(73) Assignee: Cooper-Standard Automotive Inc., Novi, MI (US)

( * ) Notice: Subject to any disclaimer, the term of this patent is extended or adjusted under 35 U.S.C. 154(b) by 325 days.

(21) Appl. No.: 14/764,684

(22) PCT Filed: Feb. 4, 2014

(86) PCT No.: PCT/US2014/014590
§ 371 (c)(1),
(2) Date: Jul. 30, 2015

(87) PCT Pub. No.: WO2014/121254
PCT Pub. Date: Aug. 7, 2014

(65) Prior Publication Data
US 2015/0381018 A1 Dec. 31, 2015

Related U.S. Application Data

(60) Provisional application No. 61/760,212, filed on Feb. 4, 2013.

(51) Int. Cl.
*H02K 11/02* (2016.01)
*H02K 1/27* (2006.01)
(Continued)

(52) U.S. Cl.
CPC ............ *H02K 11/02* (2013.01); *H02K 1/2706* (2013.01); *H02K 11/0094* (2013.01); *H02K 11/40* (2016.01)

(58) Field of Classification Search
CPC ........ H02K 11/02; H02K 11/40; H02K 1/2706
See application file for complete search history.

(56) References Cited

U.S. PATENT DOCUMENTS 4,307,310 A   12/1981  Wedman et al.
4,322,666 A * 3/1982  Muller .................... H02K 29/08
                                                  310/268

(Continued)

OTHER PUBLICATIONS

International Search Report & Written Opinion for International Application No. PCT/US2014/014590 dated Mar. 4, 2015.

(Continued)

*Primary Examiner* — Robert W Horn
(74) *Attorney, Agent, or Firm* — Carlson, Gaskey & Olds P.C.

(57) ABSTRACT

A brushless DC motor includes a stator formed of a lamstack including a plurality of stacked laminations. The stator includes a plurality of radially extending core members and a circumferential wall. An intersection of each of the plurality of radially extending core members with the circumferential wall defines a flux null location, and a portion of the lamstack defines a first opening located at one of the flux null locations. The brushless DC motor includes a printed circuit board including a second opening and a grounding member including a first section received in the first opening of the stator and a second section received in the second opening of the printed circuit board to create a grounding path.

20 Claims, 4 Drawing Sheets

(51) Int. Cl.
*H02K 11/00* (2016.01)
*H02K 11/40* (2016.01)

(56) References Cited

U.S. PATENT DOCUMENTS

| | | | | |
|---|---|---|---|---|
| 4,554,491 A * | 11/1985 | Plunkett | ................ | H02K 29/08 |
| | | | | 310/186 |
| 4,847,712 A * | 7/1989 | Crapo | ................ | G11B 19/2009 |
| | | | | 310/268 |
| 6,740,999 B1 * | 5/2004 | Segawa | ................ | H02K 5/00 |
| | | | | 310/71 |
| 6,987,338 B1 * | 1/2006 | Lavasser | ................ | A47L 5/12 |
| | | | | 15/412 |
| 7,456,533 B2 * | 11/2008 | Nanbu | ................ | H02K 11/40 |
| | | | | 310/216.137 |
| 8,587,167 B2 * | 11/2013 | Kado | ................ | H02K 5/08 |
| | | | | 310/68 R |
| 2001/0017495 A1 * | 8/2001 | Sato | ................ | H02K 5/15 |
| | | | | 310/67 R |
| 2005/0275297 A1 * | 12/2005 | Suzuki | ................ | H02K 5/225 |
| | | | | 310/71 |
| 2008/0073986 A1 * | 3/2008 | Lee | ................ | H02K 5/18 |
| | | | | 310/71 |
| 2011/0234025 A1 * | 9/2011 | Kado | ................ | H02K 5/08 |
| | | | | 310/43 |
| 2014/0361650 A1 * | 12/2014 | Schneider | ................ | H02K 11/0089 |
| | | | | 310/71 |
| 2015/0381018 A1 * | 12/2015 | Crowther | ................ | H02K 11/02 |
| | | | | 310/68 R |

OTHER PUBLICATIONS

International Preliminary Report on Patentability for International Application No. PCT/US2014/014590 dated Aug. 13, 2015.

* cited by examiner

US 9,960,660 B2

BRUSHLESS DC MOTOR WITH REDUCED EMISSIONS

BACKGROUND OF THE INVENTION

A brushless DC motor can emit radiated emissions. A concern about the amount of emissions in the environment has increased due to the increase in the quantity of electric devices. For example, many vehicles are associated with a key fob. Spurious emissions can interfere with the operation of the key fob. It is necessary to reduce emissions to meet legal requirements. In a typical brushless DC motor, electric field emissions are reduced by shielding the brushless DC motor with conductive material or by placing the brushless DC motor within a conductive enclosure.

SUMMARY OF THE INVENTION

A brushless DC motor includes a stator formed of a lamstack including a plurality of stacked laminations. The stator includes a plurality of radially extending core members and a circumferential wall. An intersection of each of the plurality of radially extending core members with the circumferential wall defines a flux null location, and a portion of the lamstack defines a first opening located at one of the flux null locations. The brushless DC motor includes a printed circuit board including a second opening and a grounding member including a first section received in the first opening of the stator and a second section received in the second opening of the printed circuit board to create a grounding path.

A brushless DC motor includes a stator formed of a lamstack including a plurality of stacked laminations. The stator includes a plurality of radially extending core members and a circumferential wall. An intersection of each of the plurality of radially extending core members with the circumferential wall defines a flux null location. A portion of the lamstack defines a first opening located at one of the flux null locations. The lamstack includes radially extending core members including an outwardly spoke and an inner circumferential core wall. A stator winding passes around each of the core members. The brushless DC motor includes a rotor assembly including a rotor and a permanent annular magnet disposed within the rotor. The stator includes a central aperture through which the rotor passes, and the stator windings generate opposing magnetic fields to rotate the rotor when current passes through the stator windings. The brushless DC motor includes a printed circuit board including a second opening and a grounding member including a first section received in the first opening of the stator and a second section received in the second opening of the printed circuit board to create a grounding path.

DETAILED DESCRIPTION OF THE PREFERRED EMBODIMENTS

Figure 1:
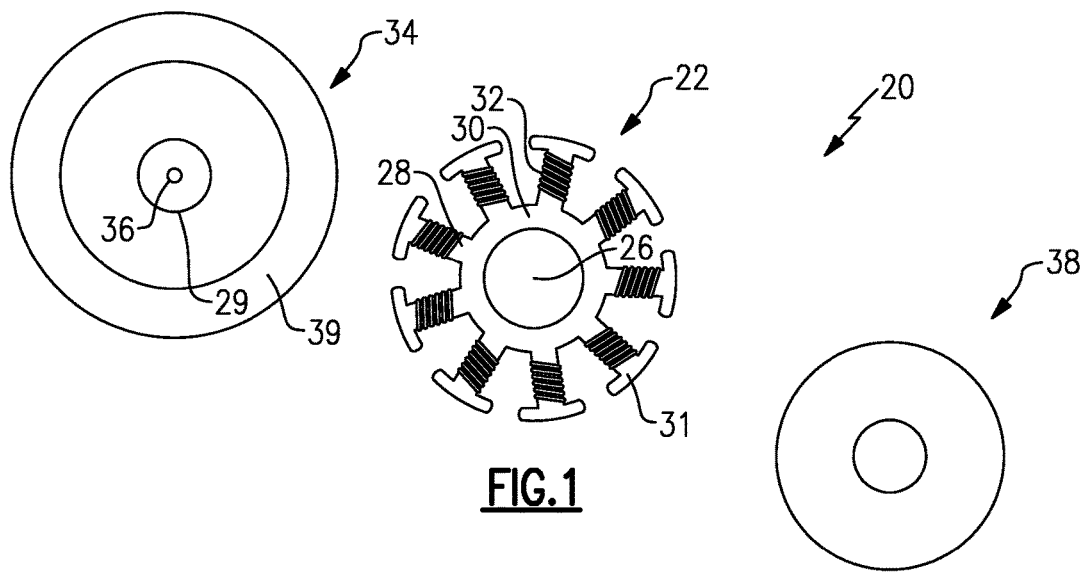
FIG. 1 illustrates a top view of components of a brushless DC motor.

FIG. 1 illustrates components of a typical brushless DC motor 20. The brushless DC motor 20 can be used with a coolant pump, an oil pump, a fan, a heat fan, an impeller, a rotary vane pump, or any other type of application or system.

Figure 2:
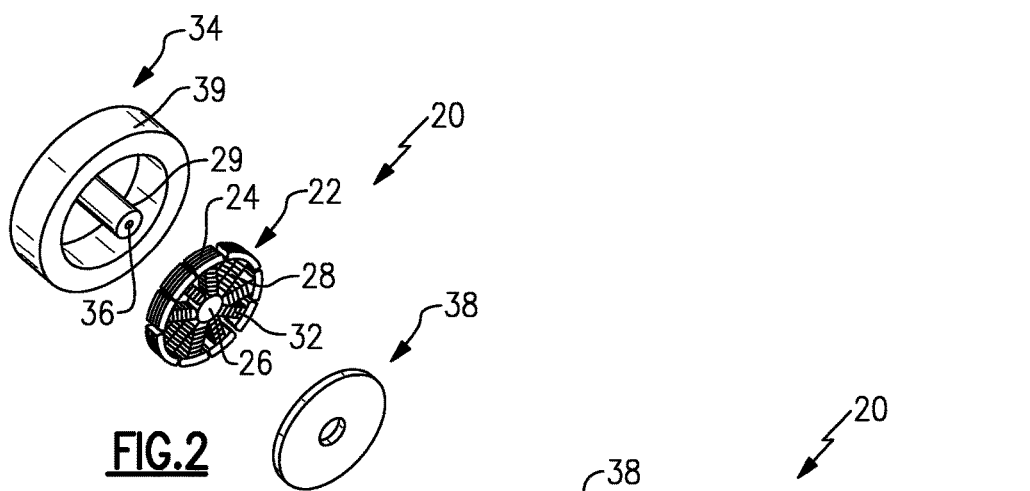
FIG. 2 illustrates a perspective exploded view of the components of the brushless DC motor.

The brushless DC motor 20 includes an iron core stator, or lamstack 22, made of a plurality of laminations 24 (shown in FIG. 2). Each lamination 24 has a thickness of approximately 1 mm. The lamstack 22 includes a central aperture 26 through which a rotor 29 (that is, the magnet) passes. In one example, the lamstack 22 includes radially extending core members 28 including an outward spoke 31 attached to an outer end of the radially extending core members 28 and an inner circumferential core wall 30 attached to an inner end the radially extending core members 28. In this example, there are nine radially extending core members 28. In another example, the lamstack 22 includes radially extending core members including an inward spoke attached to an inner end of the radially extending core members 28 and an outer circumferential core wall attached to an outer end of the radially extending core members 28 (not shown).

A stator winding 32 passes around each of the core members 28. A rotor assembly 34 includes the rotor 29 and a permanent annular magnet 36 disposed within the rotor 29. The stator windings 32 generate opposing magnetic fields to rotate the rotor 29 when current passes through the stator windings 32. A shell 39 encases these components. The assembly of the lamstack 22 and the stator windings 32 is associated with a printed circuit board 38.

Figure 3:
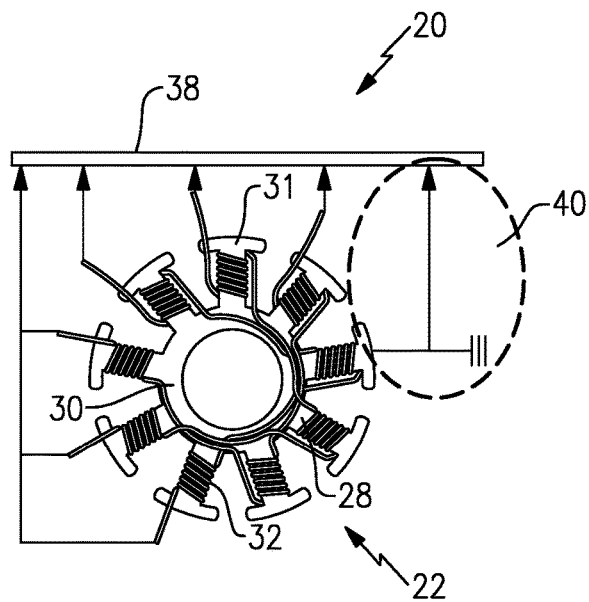
FIG. 3 illustrates a schematic diagram showing the grounding of a lamstack of the brushless DC motor.

FIG. 3 illustrates a schematic diagram showing grounding of the lamstack 22. The high frequency switching currents generated by motor control architecture provide electric field and magnetic field energy into the lamstack 22. Parasitic to normal use, the lamstack 22 operates as an antenna, and the fields are broadcasted from the lamstack 22. Grounding the lamstack 22 (as explained below) lowers both the radiated and conducted emissions. The energy absorbed by the lamstack 22 is dissipated to ground 40 as heat, and/or the lamstack 22 is "detuned" to limit its ability to re-radiate the absorbed energy.

Figure 4:
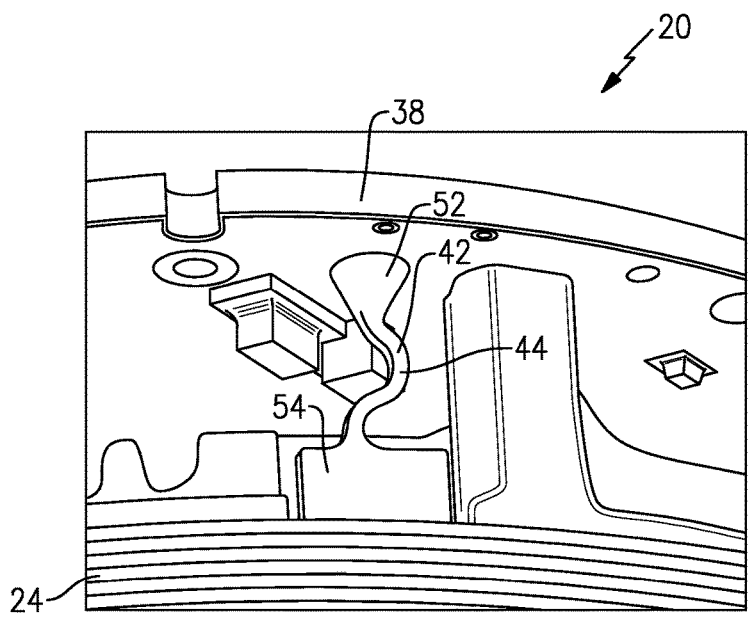
FIG. 4 illustrates a side perspective view of the brushless DC motor from an underside of a printed circuit board.
Figure 5:
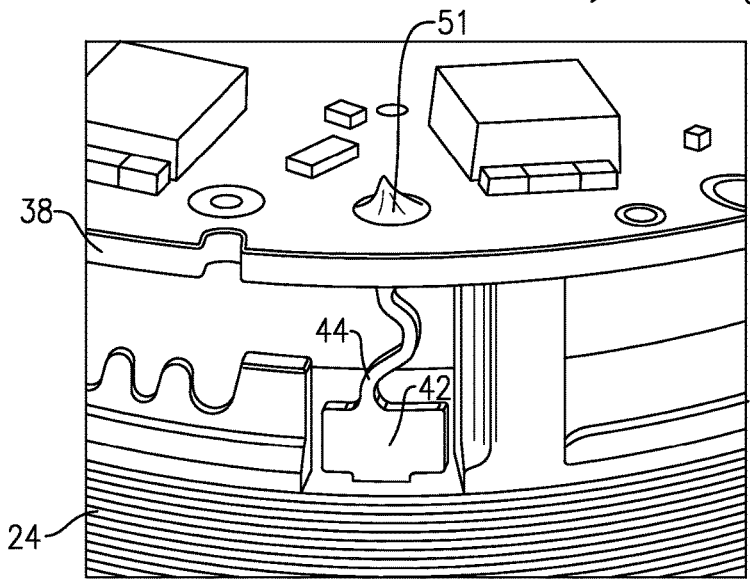
FIG. 5 illustrates a side perspective view of the brushless DC motor from an upperside of the printed circuit board.

FIGS. 4 and 5 illustrate the assembled brushless DC motor 20. A grounding member 42 is electrically connected to the lamstack 22 and to the printed circuit board 38 to create a grounding path. In one example, the grounded member 42 is a grounded pin made of an electrically conductive material. In another example, two grounding members 42 are employed. The grounding member 42 reduces emissions and provides an electrical connection with the lamstack 22 and the printed circuit board 38. In one example, the emissions are conducted emissions. In one example, the emissions are radiated emissions.

In the example shown in FIG. 6, the grounding member 42 connected to the lamstack 22 includes a first section 44 that has a portion 46 that is received in an opening 48 in the printed circuit board 38, a second section 50 that is received in an opening 52 (described below) in the lamstack 22. A body portion 54 is located between the first section 44 and the second section 50 and has a width W that is greater than a width Y of the second section 50, which limits the pressing of the grounding member 42 into the opening 52 of the lamstack 22. The portion 46 of the first section 44 of the grounding member 42 is soldered at 51 to the printed circuit board 38 either below and above the printed circuit board 38, and the solder 51 flows through the opening 48 of the lamstack 22 to the other side of the printed circuit board 38 such that solder 51 is located on both sides of the printed circuit board 38. In one example, the first section 44 is substantially curved in shape, making soldering easier and providing flexibility during temperature changes.

Figure 6:
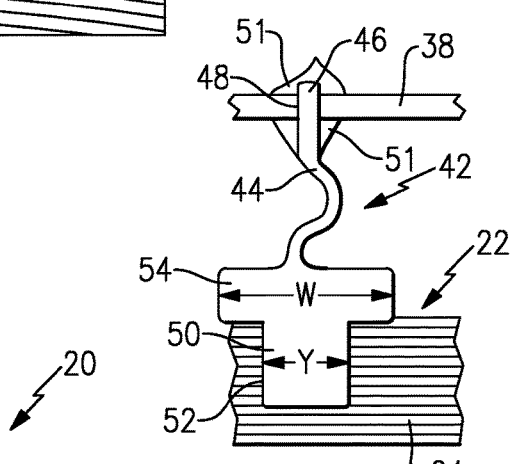
FIG. 6 illustrates a cross-sectional view of a portion of the lamstack and a grounding member received in an opening of the lamstack magnet assembly.

As shown in FIG. 6, the opening 52 is defined by a series of holes formed in about ten laminations 24 that are the most proximate to the printed circuit board 38. This ensures a good electrical connection with the lamstack 22.

Figure 7:
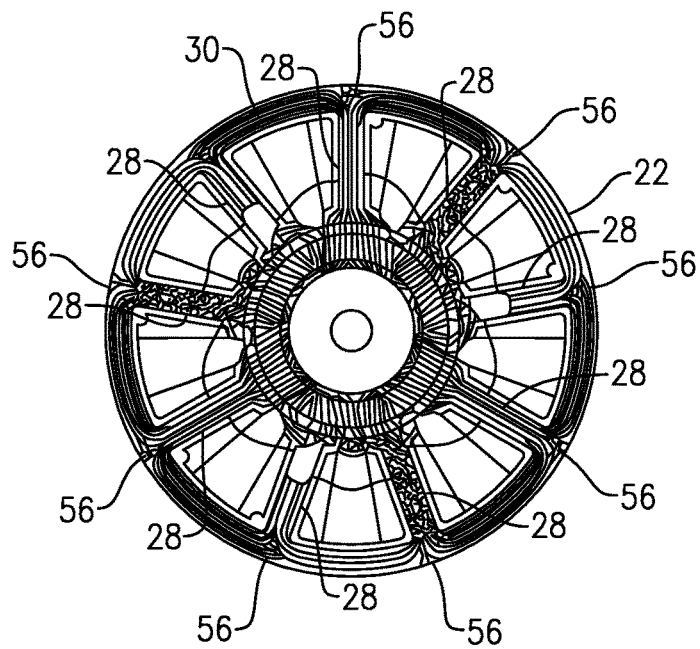
FIG. 7 illustrates a top view of a magnetic simulation of the motor.

As shown in FIG. 7, in one example, the grounding member 42 (and the openings 48 and 52) is located at one or more of nine flux null 56 locations of the lamstack 22 to reduce the loss of useful energy by eddy currents between laminations 24. A flux null location 56 is located where each of the nine core members 28 intersect with the core wall 30. In this example, there are two connections spaced apart at flux null locations 56 that receive a grounding member 42. At the flux null location 56, the magnetic field is minimal so that the eddy currents are not generated between laminations 24. A dimple (not shown) is formed by crimping at the remaining flux null locations 56 to secure the laminations 24 together and provide a good grounding path.

Figure 8:
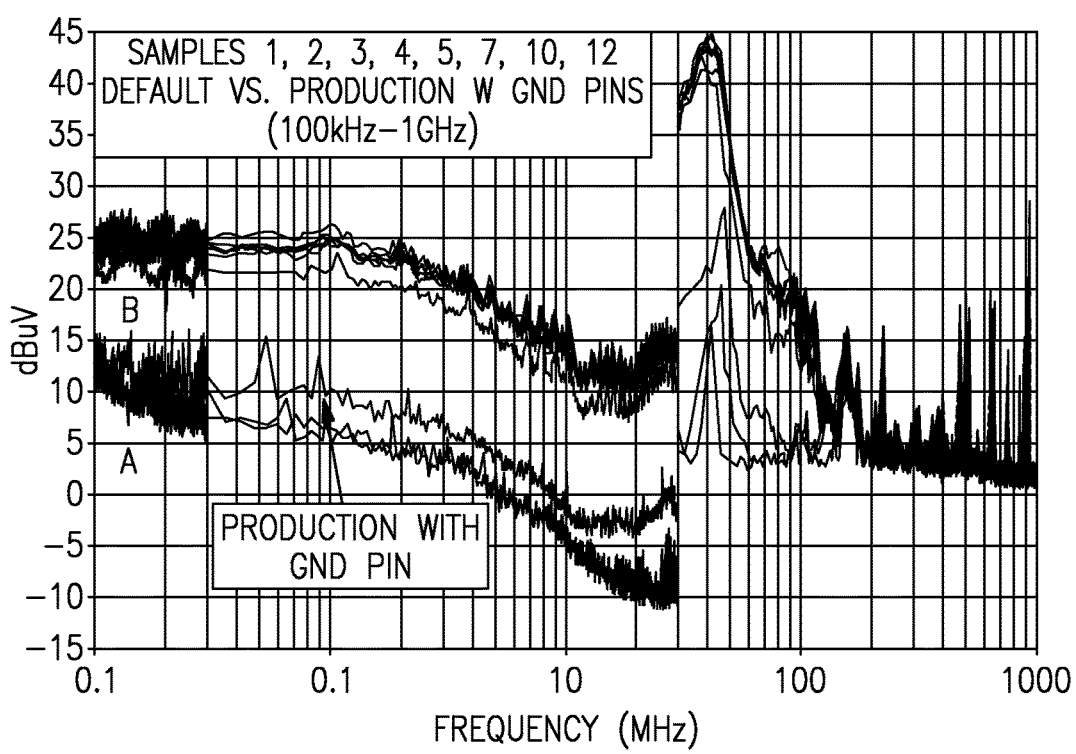
FIG. 8 illustrates a graph showing Radiated Emissions for a grounded lamstack (A) and ungrounded lamstack (B)

As shown in FIG. 8, for a grounded brushless DC motor 20, the signature A of the radiated emissions of a grounded lamstack 22 is less than the signature B of the radiated emissions of an ungrounded lamstack 22.

Figure 9:
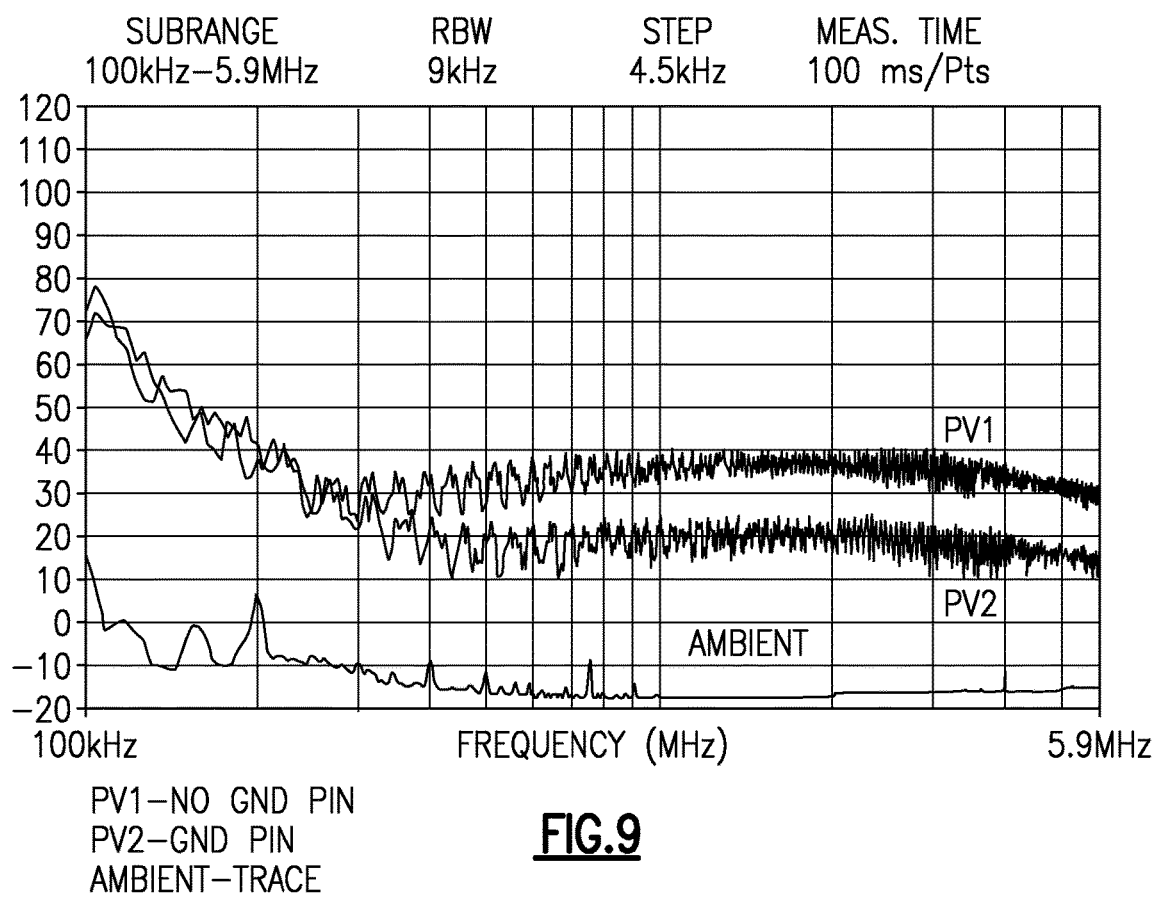
FIG. 9 illustrates a graph showing Conducted Emissions for a grounded lamstack (PV2) and an ungrounded lamstack (PV1).

FIG. 9 shows the conducted emissions signature (PV1) of an ungrounded lamstack 22 and the conducted emissions signature (PV2) of a grounded lamstack 22. The signature (PV2) of the conductive emissions of a grounded lamstack 22 is about 10-15 dB less than the signature (PV1) of the conducted emissions of an ungrounded lamstack 22. By grounding the motor iron core (lamstack 22) to the motor controller printed circuit board 38 ground plane, the generated radiated emissions can be lowered.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A brushless DC motor comprising:
   a stator formed of a lamstack including a plurality of stacked laminations, the stator including a plurality of radially extending core members and an outer circumferential wall disposed at a radially outer end of the plurality of radially extending core members, wherein an intersection of each of the plurality of radially extending core members with the circumferential wall defines a flux null location, and a portion of the lamstack defines a first opening located at at least one of the flux null locations;
   a printed circuit board including a second opening; and
   a grounding member that provides an electrical connection with the lamstack and the printed circuit board, the grounding member including a first section received in the first opening of the stator and a second section received in the second opening of the printed circuit board to create a grounding path that reduces emissions.

2. The brushless DC motor as recited in claim 1 wherein the grounding member is a pin comprised of an electrically conductive material.

3. The brushless DC motor as recited in claim 1 wherein the grounding member comprises two grounding members each located at one of the flux null locations.

4. The brushless DC motor as recited in claim 1 wherein each of the plurality of stacked laminations has a thickness of approximately 1 mm.

5. The brushless DC motor as recited in claim 1 wherein a spoke is attached to an opposing inner end of the plurality of radially extending core members.

6. The brushless DC motor as recited in claim 1 wherein a stator winding passes around each of the plurality of radially extending core members.

7. The brushless DC motor as recited in claim 6 including a rotor assembly including a rotor and a permanent annular magnet disposed within the rotor, wherein the stator includes a central aperture through which the rotor passes, and the stator windings generate opposing magnetic fields to rotate the rotor when current passes through the stator windings.

8. The brushless DC motor as recited in claim 1 wherein the first section of the grounding member is received in the first opening of the lamstack, and the second section of the grounding member includes a portion received in the second opening in the printed circuit board, and a body portion located between the first section and the second section has a width greater than a width of the first section of the grounding member.

9. The brushless DC motor as recited in claim 8 wherein the portion of the second section of the grounding member is soldered to the printed circuit board.

10. The brushless DC motor as recited in claim 8 wherein another portion of the first section of the grounding member is substantially curved in shape.

11. The brushless DC motor as recited in claim 1 wherein the emissions comprise conducted emissions.

12. The brushless DC motor as recited in claim 1 wherein the emissions comprise radiated emissions.

13. A brushless DC motor comprising:
    a stator formed of a lamstack including a plurality of stacked laminations, the stator including a plurality of radially extending core members and an outer circumferential wall disposed at a radially outer end of the plurality of radially extending core members, wherein an intersection of each of the plurality of radially extending core members with the circumferential wall defines a flux null location, a portion of the lamstack defined a first opening located at at least one of the flux null locations, an inward spoke is attached to an opposing inner end of the plurality of radially extending core members, and a stator winding passes around each of the plurality of radially extending core members;
    a rotor assembly including a rotor and a permanent annular magnet disposed within the rotor, wherein the stator includes a central aperture through which the rotor passes, and the stator windings generate opposing magnetic fields to rotate the rotor when current passes through the stator windings;

a printed circuit board including a second opening; and a grounding member that provides an electrical connection with the lamstack and the printed circuit board, the grounding member including a first section received in the first opening of the stator and a second section received in the second opening of the printed circuit board to create a grounding path that reduces emissions.

14. The brushless DC motor as recited in claim 13 wherein the grounding member is a pin comprised of an electrically conductive material.

15. The brushless DC motor as recited in claim 13 wherein the grounding member comprises two grounding members.

16. The brushless DC motor as recited in claim 13 wherein each of the plurality of stacked laminations has a thickness of approximately 1 mm.

17. The brushless DC motor as recited in claim 13 wherein the first section of the grounding member is received in the first opening of the lamstack, and the second section of the grounding member includes a portion received in the second opening in the printed circuit board, and a body portion located between the first section and the second section has a width greater than a width of the first section of the grounding member.

18. The brushless DC motor as recited in claim 17 wherein the portion of the second section of the grounding member is soldered to the printed circuit board, and another portion of the first section of the grounding member is substantially curved in shape.

19. The brushless DC motor as recited in claim 13 wherein the emissions comprise conducted emissions.

20. The brushless DC motor as recited in claim 13 wherein the emissions comprise radiated emissions.

* * * * *

UNITED STATES PATENT AND TRADEMARK OFFICE
CERTIFICATE OF CORRECTION

PATENT NO. : 9,960,660 B2  
APPLICATION NO. : 14/764684  
DATED : May 1, 2018  
INVENTOR(S) : David Crowther and Jesse Whitfield Page 1 of 1

It is certified that error appears in the above-identified patent and that said Letters Patent is hereby corrected as shown below:

On the Title Page

The Assignee should read as follows:  
(73) Assignee: Hanon Systems, Daejeon-Si, Republic of Korea Signed and Sealed this  
Thirtieth Day of April, 2019

Andrei Iancu  
*Director of the United States Patent and Trademark Office*